(12) United States Patent
Wang

(10) Patent No.: US 10,212,607 B2
(45) Date of Patent: Feb. 19, 2019

(54) METHOD FOR TRANSMITTING DATA FRAME AND DEVICE

(71) Applicant: Huawei Technologies Co., Ltd., Shenzhen, Guangdong (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 15/519,439

(22) PCT Filed: Oct. 17, 2014

(86) PCT No.: PCT/CN2014/088784
§ 371 (c)(1),
(2) Date: Apr. 14, 2017

(87) PCT Pub. No.: WO2016/058168
PCT Pub. Date: Apr. 21, 2016

(65) Prior Publication Data
US 2017/0245155 A1  Aug. 24, 2017

(51) Int. Cl.
*H04W 16/14* (2009.01)
*H04W 72/04* (2009.01)
*H04W 72/02* (2009.01)
*H04W 74/00* (2009.01)

(52) U.S. Cl.
CPC ........... *H04W 16/14* (2013.01); *H04W 72/02* (2013.01); *H04W 72/0446* (2013.01); *H04W 72/0453* (2013.01); *H04W 74/002* (2013.01)

(58) Field of Classification Search
CPC ............. H04W 16/14; H04W 72/0446; H04W 72/0453
See application file for complete search history.

(56) References Cited

U.S. PATENT DOCUMENTS

2015/0180631 A1   6/2015  Zhang

FOREIGN PATENT DOCUMENTS

| CN | 102325377 A | 1/2012 |
|---|---|---|
| CN | 103188711 A | 7/2013 |
| CN | 103944665 A | 7/2014 |
| WO | 2013006988 A1 | 1/2013 |
| WO | 2013131257 A1 | 9/2013 |
| WO | 2014/036965 A1 | 3/2014 |

OTHER PUBLICATIONS

InterDigital Communications; "On design targets and supported functionality for LTE LAA"; 3GPP TSG-RAN WG1 #78bis; R1-144219; Ljubljana, Slovenia; Oct. 6-10, 2014; 6 pages.

*Primary Examiner* — Ronald B Abelson

(57) ABSTRACT

Embodiments of the present invention provide a method for transmitting a data frame and a device. The method includes: determining, by a first device, a transmission pattern of the first device, where the transmission pattern includes a quantity and positions of occupied data frames and a quantity and positions of idle data frames in one transmission period; and occupying, by the first device, an unlicensed carrier according to the transmission pattern of the first device, to transmit a data frame of the first device. According to the embodiments of the present invention, fairness of occupying an unlicensed carrier by multiple devices can be ensured.

14 Claims, 1 Drawing Sheet

100

A first device determines a transmission pattern of the first device, where the transmission pattern includes a quantity and positions of occupied data frames and a quantity and positions of idle data frames in one transmission period  ~S110

The first device occupies an unlicensed carrier according to the transmission pattern of the first device, to transmit a data frame of the first device  ~S120

METHOD FOR TRANSMITTING DATA FRAME AND DEVICE

CROSS REFERENCE TO RELATED APPLICATIONS

The present application claims priority under 35 U.S.C. § 365 to International Patent Application No. PCT/CN2014/088784 filed Oct. 17, 2014, which is incorporated herein by reference into the present disclosure as if fully set forth herein.

TECHNICAL FIELD

The present invention relates to the communications field, and more specifically, to a method for transmitting a data frame and a device.

BACKGROUND

Spectrums used in an existing wireless communications system are classified into two types: a licensed spectrum (English: licensed spectrum) and an unlicensed spectrum (English: unlicensed spectrum). Any operator may deploy a device in an unlicensed frequency band, for example, a Wireless Fidelity (full spelling in English: wireless fidelity, WiFi for short) device in a 2.4 GHz and 5 GHz frequency band.

In the prior art, on an unlicensed carrier, all data frames are transmitted in a time contention manner, and sending of a data frame is not started until a time resource is obtained through contention. If some devices can always obtain a time resource through contention, some other devices can never obtain a time resource through contention, and therefore can never occupy an unlicensed carrier. Therefore, fairness of occupying an unlicensed carrier by multiple devices cannot be ensured in the prior art.

SUMMARY

Embodiments of the present invention provide a method for transmitting a data frame and a device, so as to ensure fairness of occupying an unlicensed carrier by multiple devices.

According to a first aspect, a method for transmitting a data frame is provided, including: determining, by a first device, a transmission pattern of the first device, where the transmission pattern includes a quantity and positions of occupied data frames and a quantity and positions of idle data frames in one transmission period; and occupying, by the first device, an unlicensed carrier according to the transmission pattern of the first device, to transmit a data frame of the first device.

With reference to the first aspect, in a first possible implementation manner of the first aspect, the method further includes: the determining, by a first device, a transmission pattern of the first device includes: obtaining, by the first device, a transmission pattern of a second device occupying the unlicensed carrier, where the second device is all devices occupying the unlicensed carrier; and determining, by the first device, the transmission pattern of the first device according to the transmission pattern of the second device.

With reference to the first possible implementation manner of the first aspect, in a second possible implementation manner of the first aspect, the determining, by the first device, the transmission pattern of the first device according to the transmission pattern of the second device includes: determining, by the first device, idle time resources of the unlicensed carrier according to the transmission pattern of the second device; and selecting some or all of the idle time resources to transmit the occupied data frames of the first device, so as to determine the transmission pattern of the first device.

With reference to the first possible implementation manner of the first aspect, in a third possible implementation manner of the first aspect, the determining, by the first device, the transmission pattern of the first device according to the transmission pattern of the second device includes: determining, according to the transmission pattern of the second device, a ratio of the unlicensed carrier occupied by each device of the second device; and selecting some or all time resources occupied by a device that occupies a highest ratio of the unlicensed carrier, to transmit the occupied data frames of the first device, so as to determine the transmission pattern of the first device.

With reference to the first aspect, in a fourth possible implementation manner of the first aspect, the method further includes: sending, by the first device, the transmission pattern of the first device.

With reference to the fourth possible implementation manner of the first aspect, in a fifth possible implementation manner of the first aspect, the sending, by the first device, the transmission pattern of the first device includes: sending, by the first device, the transmission pattern of the first device by using the unlicensed carrier or a licensed carrier.

With reference to any one of the first aspect or the first to the fifth possible implementation manners of the first aspect, in a sixth possible implementation manner of the first aspect, the determining, by a first device, a transmission pattern of the first device includes: identifying, by the first device, an unlicensed spectrum Long Term Evolution (full spelling in English: Unlicensed spectrum Long Term Evolution, LTE-U for short) device occupying the unlicensed carrier; and determining, by the first device, the transmission pattern of the first device according to a transmission pattern of the LTE-U device.

With reference to the sixth possible implementation manner of the first aspect, in a seventh possible implementation manner of the first aspect, the identifying, by the first device, an LTE-U device includes: identifying, by the first device, the LTE-U device by using a primary synchronization signal PSS, a secondary synchronization signal SSS, or a specific scrambling code of a data frame of the LTE-U device.

With reference to any one of the first aspect or the first to the seventh possible implementation manners of the first aspect, in an eighth possible implementation manner of the first aspect, the first device is a base station or user equipment.

According to a second aspect, a first device is provided, including: a determining unit, configured to determine a transmission pattern of the first device, where the transmission pattern includes a quantity and positions of occupied data frames and a quantity and positions of idle data frames in one transmission period; and a transmission unit, configured to occupy an unlicensed carrier according to the transmission pattern of the first device, to transmit a data frame of the first device.

With reference to the second aspect, in a first possible implementation manner of the second aspect, the determining unit is specifically configured to: obtain a transmission pattern of a second device occupying the unlicensed carrier, where the second device is all devices occupying the unlicensed carrier; and determine, according to the transmission pattern of the second device, the transmission pattern of the first device.

With reference to the first possible implementation manner of the second aspect, in a second possible implementation manner of the second aspect, the determining unit is specifically configured to: determine idle time resources of the unlicensed carrier according to the transmission pattern of the second device; and select some or all of the idle time resources to transmit the occupied data frames of the first device, so as to determine the transmission pattern of the first device.

With reference to the first possible implementation manner of the second aspect, in a third possible implementation manner of the second aspect, the determining unit is specifically configured to: determine, according to the transmission pattern of the second device, a ratio of the unlicensed carrier occupied by each device of the second device; and select some or all time resources occupied by a device that occupies a highest ratio of the unlicensed carrier, to transmit the occupied data frames of the first device, so as to determine the transmission pattern of the first device.

With reference to the second aspect, in a fourth possible implementation manner of the second aspect, the first device further includes: a sending unit, configured to send the transmission pattern of the first device.

With reference to the fourth possible implementation manner of the second aspect, in a fifth possible implementation manner of the second aspect, the sending unit is specifically configured to send the transmission pattern of the first device by using the unlicensed carrier or a licensed carrier.

With reference to any one of the second aspect or the first to the fifth possible implementation manners of the second aspect, in a sixth possible implementation manner of the second aspect, the determining unit is specifically configured to: identify an unlicensed spectrum Long Term Evolution (full spelling in English: Unlicensed spectrum Long Term Evolution, LTE-U for short) device occupying the unlicensed carrier; and determine the transmission pattern of the first device according to a transmission pattern of the LTE-U device.

With reference to the sixth possible implementation manner of the second aspect, in a seventh possible implementation manner of the second aspect, the determining unit is specifically configured to identify the LTE-U device by using a primary synchronization signal PSS, a secondary synchronization signal SSS, or a specific scrambling code of a data frame of the LTE-U device.

With reference to any one of the second aspect or the first to the seventh possible implementation manners of the second aspect, in an eighth possible implementation manner of the second aspect, the first device is a base station or user equipment.

Based on the foregoing technical solutions, in the embodiments of the present invention, a first device may determine a transmission pattern of the first device, where the transmission pattern includes a quantity and positions of occupied data frames and a quantity and positions of idle data frames in one transmission period; and the first device occupies an unlicensed carrier according to the transmission pattern of the first device, to transmit a data frame of the first device. Therefore, fairness of occupying an unlicensed carrier by multiple devices can be ensured.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD), Universal Mobile Telecommunications System (Universal Mobile Telecommunications System, UMTS), and a Worldwide Interoperability for Microwave Access (Worldwide Interoperability for Microwave Access, WiMAX) communications system.

It should be understood that in the embodiments of the present invention, user equipment (full spelling in English: User Equipment, UE for short) includes, but is not limited to, a mobile station (full spelling in English: Mobile Station, MS for short), a mobile terminal (Mobile Terminal), a mobile telephone (Mobile Telephone), a handset (handset), portable equipment (portable equipment), and the like. The user equipment may communicate with one or more core networks by using a radio access network (full spelling in English: Radio Access Network, RAN for short). For example, the user equipment may be a mobile telephone (or referred to as a "cellular" phone), or a computer having a wireless communication function; or the user equipment may be a portable, pocket-sized, handheld, computer built-in, or in-vehicle mobile apparatus.

In the embodiments of the present invention, the base station may be a base station (full spelling in English: Base Transceiver Station, BTS for short) in GSM or CDMA, or may be a base station (NodeB) in WCDMA, or may be an evolved NodeB (full spelling in English: evolved NodeB, eNB or e-NodeB for short) in LTE, which is not limited in the embodiments of the present invention.

It should be understood that, in the embodiments of the present invention, a first device and a second device are used for distinguishing only, and are not for the purpose of limitation in the embodiments of the present invention.

Figure 1:
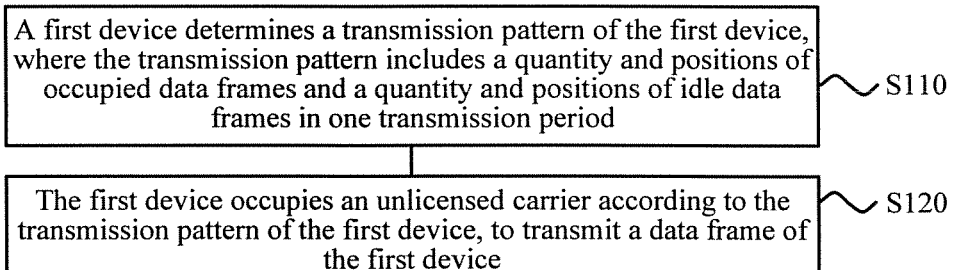
FIG. 1 is a schematic flowchart of a method for transmitting a data frame according to an embodiment of the present invention.

FIG. 1 shows a method 100 for transmitting a data frame. The method 100 may be, for example, performed by a first device. As shown in FIG. 1, the method 100 includes the following steps.

S110: A first device determines a transmission pattern of the first device, where the transmission pattern includes a quantity and positions of occupied data frames and a quantity and positions of idle data frames in one transmission period.

Specifically, the occupied data frame is a data frame used to transmit data, and the idle data frame is an idle data frame that has not been used to transmit data.

TABLE 1

| Index | Transmission pattern |
|---|---|
| 0 | 1111 |
| 1 | 1110 |
| 2 | 1100 |
| 3 | 1000 |
| 4 | 1010 |

For a transmission pattern whose transmission period is four data frames, refer to Table 1. "1" represents an occupied data frame, and "0" represents an idle data frame. For example, a transmission pattern 1010 indicates that one transmission period includes two occupied data frames and two idle data frames. If positions of specified occupied data frames are 0 and 2, positions of idle data frames are 1 and 3. A position determining manner is not limited in this embodiment.

It should be understood that one transmission period in the transmission pattern may also include different quantities, such as six and eight, of data frames. Due to limited space, details are not described herein.

It should be understood that, lengths of data frames in this embodiment of the present invention may be equal or not equal, may be preset or configured by a third party. This is not limited in this embodiment of the present invention.

S120: The first device occupies an unlicensed carrier according to the transmission pattern of the first device, to transmit a data frame of the first device.

It should be understood that, the first device may occupy the unlicensed carrier according to the transmission pattern of the first device by using multiple methods, to transmit the data frame of the first device. This is not limited in this embodiment of the present invention.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The method for transmitting a data frame according to this embodiment of the present invention is described above in detail from the perspective of the first device with reference to FIG. 1.

This embodiment of the present invention is described below in further detail with reference to a specific example. It should be noted that the example in FIG. 1 is merely used to help a person skilled in the art to understand this embodiment of the present invention, instead of limiting this embodiment of the present invention to the specific illustrated numerical values or the illustrated specific scenario. It is obvious that a person skilled in the art may make various equivalent modifications or changes according to the example given in FIG. 1, and such modifications or changes also fall within the scope of this embodiment of the present invention.

According to this embodiment of the present invention, the determining, by a first device, a transmission pattern of the first device includes: obtaining, by the first device, a transmission pattern of a second device occupying the unlicensed carrier, where the second device is all devices occupying the unlicensed carrier; and determining, by the first device, the transmission pattern of the first device according to the transmission pattern of the second device.

Specifically, the first device may receive the transmission pattern that is sent in a broadcast form by the second device occupying the unlicensed carrier.

Optionally, the determining, by the first device, the transmission pattern of the first device according to the transmission pattern of the second device includes: determining, by the first device, idle time resources of the unlicensed carrier according to the transmission pattern of the second device; and selecting some or all of the idle time resources to transmit the occupied data frames of the first device, so as to determine the transmission pattern of the first device.

It should be understood that, the first device may select some or all of the idle time resources in multiple manners, to transmit the occupied data frames of the first device. This is not limited in this embodiment of the present invention.

Optionally, the determining, by the first device, the transmission pattern of the first device according to the transmission pattern of the second device includes: determining, according to the transmission pattern of the second device, a ratio of the unlicensed carrier occupied by each device of the second device; and selecting some or all time resources occupied by a device that occupies a highest ratio of the unlicensed carrier, to transmit the occupied data frames of the first device, so as to determine the transmission pattern of the first device.

It should be understood that, the first device may select, in multiple manners, some or all time resources occupied by the device that occupies the highest ratio of the unlicensed carrier, to transmit the occupied data frames of the first device. This is not limited in this embodiment of the present invention.

Optionally, the method further includes: sending, by the first device, the transmission pattern of the first device.

Specifically, the first device sends the transmission pattern of the first device in a broadcast manner.

Optionally, the sending, by the first device, the transmission pattern of the first device includes: sending, by the first device, the transmission pattern of the first device by using the unlicensed carrier or a licensed carrier.

It should be understood that the first device may send the transmission pattern of the first device in multiple manners. This is not limited in this embodiment of the present invention.

Optionally, the determining, by the first device, the transmission pattern of the first device according to the transmission pattern of the second device includes: identifying, by the first device, an unlicensed spectrum Long Term Evolution (full spelling in English: Unlicensed spectrum Long Term Evolution, LTE-U for short) device occupying the unlicensed carrier; determining, by the first device, the transmission pattern of the first device according to a transmission pattern of the LTE-U device.

It should be understood that the LTE-U device is identified only when the method for transmitting a data frame in the present invention is applied to the LTE-U device. This may avoid affecting another device occupying the unlicensed carrier, for example, normal working of a WiFi device.

Optionally, the identifying, by the first device, an LTE-U device includes: identifying, by the first device, the LTE-U device by using a primary synchronization signal (full spelling in English: primary synchronization signal, PSS for short), a secondary synchronization signal (full spelling in English: secondary synchronization signal, SSS for short), or a specific scrambling code of a data frame of the LTE-U device.

It should be understood that the first device may identify the LTE-U device in multiple manners. This is not limited in this embodiment of the present invention.

Optionally, the first device may be a base station or user equipment.

Therefore, in this embodiment of the present invention, fairness of occupying an unlicensed carrier by multiple devices can be ensured.

The method for transmitting a data frame according to this embodiment of the present invention is described above in detail with reference to FIG. 1. A first device according to an embodiment of the present invention is described below in detail with reference to FIG. 2 and FIG. 3.

Figure 2:
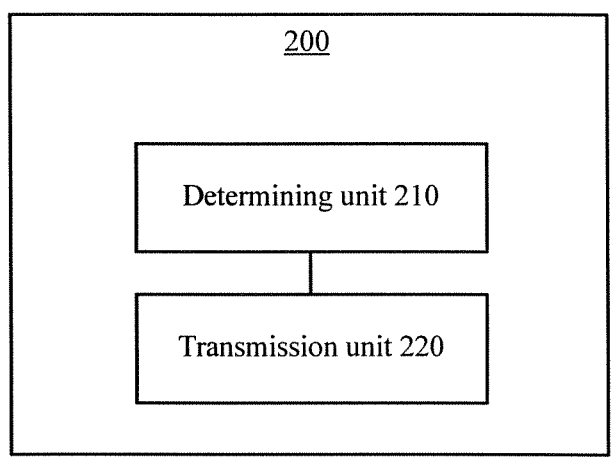
FIG. 2 is a schematic block diagram of a first device according to an embodiment of the present invention.

FIG. 2 is a schematic block diagram of a first device 200 according to an embodiment of the present invention. As shown in FIG. 2, the first device 200 includes: a determining unit 210 and a transmission unit 220.

The determining unit 210 is configured to determine a transmission pattern of the first device, where the transmission pattern includes a quantity and positions of occupied data frames and a quantity and positions of idle data frames in one transmission period.

Specifically, the occupied data frame is a data frame used to transmit data, and the idle data frame is an idle data frame that has not been used to transmit data. This is not limited in this embodiment of the present invention.

For a transmission pattern whose transmission period is four data frames, refer to Table 1. "1" represents an occupied data frame, and "0" represents an idle data frame. For example, a transmission pattern 1010 indicates that one transmission period includes two occupied data frames and two idle data frames. If positions of specified occupied data frames are 0 and 2, positions of idle data frames are 1 and 3. A position determining manner is not limited in this embodiment.

It should be understood that one transmission period in the transmission pattern may also include different quantities, such as six and eight, of data frames. Due to limited space, details are not described herein.

The transmission unit 220 is configured to occupy an unlicensed carrier according to the transmission pattern of the first device, to transmit a data frame of the first device.

It should be understood that, the transmission unit 230 may occupy the unlicensed carrier according to the transmission pattern of the first device by using multiple methods, to transmit the data frame of the first device. This is not limited in this embodiment of the present invention.

The first device 200 according to this embodiment of the present invention is described above in detail with reference to FIG. 2.

This embodiment of the present invention is described below in further detail with reference to a specific example. It should be noted that the example in FIG. 2 is merely used to help a person skilled in the art to understand this embodiment of the present invention, instead of limiting this embodiment of the present invention to the specific illustrated numerical values or the illustrated specific scenario. It is obvious that a person skilled in the art may make various equivalent modifications or changes according to the example given in FIG. 2, and such modifications or changes also fall within the scope of this embodiment of the present invention.

According to this embodiment of the present invention, the determining unit 210 is specifically configured to: obtain a transmission pattern of a second device occupying the unlicensed carrier, where the second device is all devices occupying the unlicensed carrier; and determine, according to the transmission pattern of the second device, the transmission pattern of the first device.

Specifically, the first device may receive the transmission pattern that is sent in a broadcast form by the second device occupying the unlicensed carrier, to obtain the transmission pattern of the second device occupying the unlicensed carrier.

Optionally, the determining unit 210 is specifically configured to: determine idle time resources of the unlicensed carrier according to the transmission pattern of the second device, and select some or all of the idle time resources to transmit the occupied data frames of the first device, so as to determine the transmission pattern of the first device.

It should be understood that, the determining unit 210 may select some or all of the idle time resources in multiple manners, to transmit the occupied data frames of the first device. This is not limited in this embodiment of the present invention.

Optionally, the determining unit 210 is specifically configured to: determine, according to the transmission pattern of the second device, a ratio of the unlicensed carrier occupied by each device of the second device; and select some or all time resources occupied by a device that occupies a highest ratio of the unlicensed carrier, to transmit the occupied data frames of the first device, so as to determine the transmission pattern of the first device.

It should be understood that, the determining unit 210 may select, in multiple manners, some or all time resources occupied by the device that occupies the highest ratio of the unlicensed carrier, to transmit the occupied data frames of the first device. This is not limited in this embodiment of the present invention.

Optionally, the first device further includes: a sending unit, configured to send the transmission pattern of the first device.

Specifically, the sending unit may send the transmission pattern of the first device in a broadcast manner; and optionally, the sending unit is specifically configured to send the transmission pattern of the first device by using the unlicensed carrier or a licensed carrier.

It should be understood that the sending unit may send the transmission pattern of the first device in multiple manners. This is not limited in this embodiment of the present invention.

Optionally, the determining unit 210 is specifically configured to: identify an unlicensed spectrum Long Term Evolution (full spelling in English: Unlicensed spectrum Long Term Evolution, LTE-U for short) device occupying the unlicensed carrier; and determine the transmission pattern of the first device according to a transmission pattern of the LTE-U device.

It should be understood that the LTE-U device is identified only when the method for transmitting a data frame in the present invention is applied to the LTE-U device. This may avoid affecting another device occupying the unlicensed carrier, for example, normal working of a WiFi device.

Optionally, the determining unit 210 is specifically configured to identify the LTE-U device by using a primary synchronization signal (full spelling in English: primary synchronization signal, PSS for short), a secondary synchronization signal (full spelling in English: secondary synchronization signal, SSS for short), or a specific scrambling code of a data frame of the LTE-U device.

It should be understood that the determining unit 210 may identify the LTE-U device in multiple manners. This is not limited in this embodiment of the present invention.

Optionally, the first device may be a base station or user equipment.

Therefore, in this embodiment of the present invention, fairness of occupying an unlicensed carrier by multiple devices can be ensured.

Figure 3:
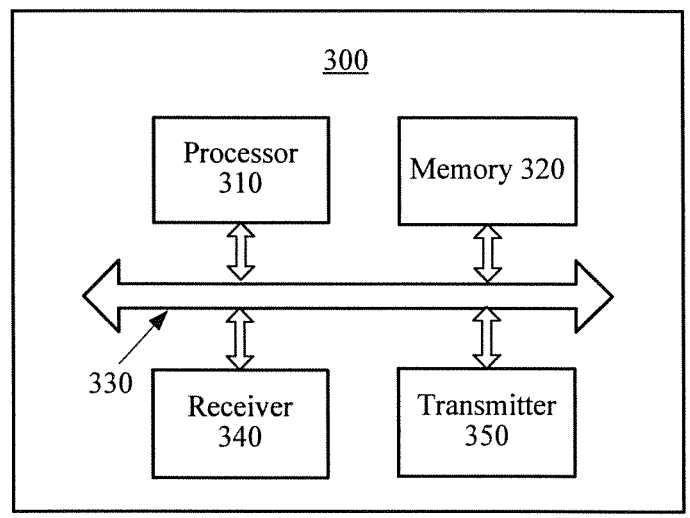
FIG. 3 is a schematic block diagram of a first device according to another embodiment of the present invention.

In another implementation manner, as shown in FIG. 3, an embodiment of the present invention further provides a first device 300. The first device 300 includes a processor 310, a memory 320, a bus system 330, a receiver 340, and a transmitter 350. The processor 310, the memory 320, the receiver 340, and the transmitter 350 are connected by using the bus system 330. The memory 320 is configured to store an instruction. The processor 310 is configured to execute the instruction stored in the memory 320, to control the receiver 340 to receive a signal, an instruction, or a message, and to control the transmitter 350 to send a signal, signaling, a message, or the like. The processor 310 is configured to determine a transmission pattern of the first device, where the transmission pattern includes a quantity and positions of occupied data frames and a quantity and positions of idle data frames in one transmission period; the transmitter 350 is configured to occupy an unlicensed carrier according to the transmission pattern of the first device, to transmit a data frame of the first device.

The first device 300 according to this embodiment of the present invention is described above in detail with reference to FIG. 3.

This embodiment of the present invention is described below in further detail with reference to a specific example. It should be noted that the example in FIG. 3 is merely used to help a person skilled in the art to understand this embodiment of the present invention, instead of limiting this embodiment of the present invention to the specific illustrated numerical values or the illustrated specific scenario. It is obvious that a person skilled in the art may make various equivalent modifications or changes according to the example given in FIG. 3, and such modifications or changes also fall within the scope of this embodiment of the present invention.

According to this embodiment of the present invention, the processor 310 is specifically configured to: obtain a transmission pattern of a second device occupying the unlicensed carrier, where the second device is all devices occupying the unlicensed carrier; and determine, according to the transmission pattern of the second device, the transmission pattern of the first device.

Specifically, the first device may receive the transmission pattern that is sent in a broadcast form by the second device occupying the unlicensed carrier, to obtain the transmission pattern of the second device occupying the unlicensed carrier.

Optionally, the processor 310 is specifically configured to: determine idle time resources of the unlicensed carrier according to the transmission pattern of the second device; and select some or all of the idle time resources to transmit the occupied data frames of the first device, so as to determine the transmission pattern of the first device.

Optionally, the processor 310 is specifically configured to: determine, according to the transmission pattern of the second device, a ratio of the unlicensed carrier occupied by each device of the second device; and select some or all time resources occupied by a device that occupies a highest ratio of the unlicensed carrier, to transmit the occupied data frames of the first device, so as to determine the transmission pattern of the first device.

Optionally, the transmitter 350 is specifically configured to send the transmission pattern of the first device.

Optionally, the transmitter 350 sends the transmission pattern of the first device by using the unlicensed carrier or a licensed carrier.

Optionally, the processor 310 is specifically configured to: identify an unlicensed spectrum Long Term Evolution (full spelling in English: Unlicensed spectrum Long Term Evolution, LTE-U for short) device occupying the unlicensed carrier; and determine the transmission pattern of the first device according to a transmission pattern of the LTE-U device.

It should be understood that the LTE-U device is identified only when the method for transmitting a data frame in the present invention is applied to the LTE-U device. This may avoid affecting another device occupying the unlicensed carrier, for example, normal working of a WiFi device.

Optionally, the processor 310 is specifically configured to identify the LTE-U device by using a primary synchronization signal (full spelling in English: primary synchronization signal, PSS for short), a secondary synchronization signal (full spelling in English: secondary synchronization signal, SSS for short), or a specific scrambling code of a data frame of the LTE-U device.

Optionally, the first device may be a base station or user equipment.

Therefore, in this embodiment of the present invention, fairness of occupying an unlicensed carrier by multiple devices can be ensured.

It should be understood that in this embodiment of the present invention, the processor 310 may be a central processing unit (Central Processing Unit, "CPU" for short), or the processor 310 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 320 may include a read-only memory and a random access memory, and provides an instruction and data to the processor 310. A part of the memory 320 may further include a non-volatile random access memory. For example, the memory 320 may further store device type information.

The bus system 330 may include a power bus, a control bus, a status signal bus, and the like in addition to a data bus. However, for the purpose of clear description, various types of buses in the figure are all marked as the bus system 330.

In an implementation process, the steps of the foregoing method may be completed by using a hardware integrated logical circuit in the processor 310 or a software-form instruction. Steps of the method disclosed with reference to the embodiment of the present invention may be directly performed and completed by means of a hardware processor, or may be performed and completed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 320, and the processor 310 reads information in the memory 320 and completes the steps of the foregoing methods in combination with hardware of the processor 310. To avoid repetition, details are not described herein.

It should be understood that the first device 200 and the first device 300 in the embodiments of the present invention may correspond to the first device of the method for transmitting a data frame in the embodiment of the present invention, and the foregoing and other operations and/or functions of the modules of the first device 200 and the first device 300 are separately used to implement corresponding procedures of the methods in FIG. 1. For brevity, details are not described herein.

In addition, a computer readable media (or medium) is further provided, and includes a computer readable instruction performing the following operations when the computer readable medium is executed: performing the operations of S110 and S120 in the method in the foregoing embodiment.

In addition, a computer program product is further provided, including the foregoing computer readable medium.

It should be noted that: the signaling mentioned herein includes, but is not limited to, an indication, information, a signal, a message, or the like, which is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a fault of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting a data frame, the method comprising:
   determining, by a first device, a transmission pattern of the first device, wherein the transmission pattern comprises a quantity and positions of occupied data frames and a quantity and positions of idle data frames in one transmission period;
   occupying, by the first device, an unlicensed carrier according to the transmission pattern of the first device, to transmit a data frame of the first device; and
   wherein determining, by the first device, the transmission pattern of the first device comprises:
      obtaining, by the first device, a transmission pattern of a second device occupying the unlicensed carrier, wherein the second device indicates all devices occupying the unlicensed carrier, and determining, by the first device, the transmission pattern of the first device according to the transmission pattern of the second device.

2. The method according to claim 1, wherein determining, by the first device, the transmission pattern of the first device according to the transmission pattern of the second device comprises:

determining, by the first device, idle time resources of the unlicensed carrier according to the transmission pattern of the second device; and selecting some or all of the idle time resources to transmit the occupied data frame of the first device, so as to determine the transmission pattern of the first device.

3. The method according to claim 1, wherein determining, by the first device, the transmission pattern of the first device according to the transmission pattern of the second device comprises:

determining, by the first device according to the transmission pattern of the second device, a ratio of the unlicensed carrier occupied by each device of the second device; and selecting some or all time resources occupied by a device that occupies a highest ratio of the unlicensed carrier, to transmit the occupied data frames of the first device, so as to determine the transmission pattern of the first device.

4. The method according to claim 1, further comprising:
sending, by the first device, the transmission pattern of the first device.

5. The method according to claim 4, wherein sending, by the first device, the transmission pattern of the first device comprises:

sending, by the first device, the transmission pattern of the first device by using the unlicensed carrier or a licensed carrier.

6. The method according to claim 1, wherein the first device is a base station or user equipment.

7. A method for transmitting a data frame, the method comprising:

determining, by a first device, a transmission pattern of the first device, wherein the transmission pattern comprises a quantity and positions of occupied data frames and a quantity and positions of idle data frames in one transmission period;

occupying, by the first device, an unlicensed carrier according to the transmission pattern of the first device, to transmit a data frame of the first device; and wherein determining, by the first device, the transmission pattern of the first device comprises:

identifying, by the first device, an unlicensed spectrum Long Term Evolution (LTE-U) device occupying the unlicensed carrier, and determining, by the first device, the transmission pattern of the first device according to a transmission pattern of the LTE-U device; and wherein identifying, by the first device, the LTE-U device comprises:

identifying, by the first device, the LTE-U device by using a primary synchronization signal (PSS), a secondary synchronization signal (SSS), or a specific scrambling code of a data frame of the LTE-U device.

8. A first device, comprising:
a non-transitory computer readable medium having instructions stored thereon; and a processor coupled to the non-transitory computer readable medium and configured to execute the instructions to:

determine a transmission pattern of the first device, wherein the transmission pattern comprises a quantity and positions of occupied data frames and a quantity and positions of idle data frames in one transmission period, occupy an unlicensed carrier according to the transmission pattern of the first device, to transmit a data frame of the first device, obtain a transmission pattern of a second device occupying the unlicensed carrier, wherein the second device is all devices occupying the unlicensed carrier, and determine, according to the transmission pattern of the second device, the transmission pattern of the first device.

9. The first device according to claim 8, wherein the processor is further configured to execute the instructions to:

determine idle time resources of the unlicensed carrier according to the transmission pattern of the second device; and select some or all of the idle time resources to transmit the occupied data frames of the first device, so as to determine the transmission pattern of the first device.

10. The first device according to claim 8, wherein the processor is further configured to execute the instructions to:

determine, according to the transmission pattern of the second device, a ratio of the unlicensed carrier occupied by each device of the second device; and select some or all time resources occupied by a device that occupies a highest ratio of the unlicensed carrier, to transmit the occupied data frames of the first device, so as to determine the transmission pattern of the first device.

11. The first device according to claim 8, further comprising:

a transmitter, configured to send the transmission pattern of the first device.

12. The first device according to claim 11, wherein
the transmitter is configured to send the transmission pattern of the first device by using the unlicensed carrier or a licensed carrier.

13. The first device according to claim 8, wherein the first device is a base station or user equipment.

14. A first device, comprising:
a non-transitory computer readable medium having instructions stored thereon; and a processor coupled to the non-transitory computer readable medium and configured to execute the instructions to:

determine a transmission pattern of the first device, wherein the transmission pattern comprises a quantity and positions of occupied data frames and a quantity and positions of idle data frames in one transmission period, occupy an unlicensed carrier according to the transmission pattern of the first device, to transmit a data frame of the first device, identify an unlicensed spectrum Long Term Evolution (LTE-U) device occupying the unlicensed carrier; and determine the transmission pattern of the first device according to a transmission pattern of the LTE-U device, and identify the LTE-U device by using a primary synchronization signal (PSS), a secondary synchronization signal (SSS), or a specific scrambling code of a data frame of the LTE-U device.

* * * * *